(12) United States Patent
Reisbach

(10) Patent No.: US 8,328,607 B2
(45) Date of Patent: Dec. 11, 2012

(54) ENHANCED PICCOLO DUCTING WITH SIDEWALL AIR OUTLETS

(75) Inventor: Sven Reisbach, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 657 days.

(21) Appl. No.: 12/474,812

(22) Filed: May 29, 2009

(65) Prior Publication Data

US 2009/0298408 A1 Dec. 3, 2009

Related U.S. Application Data

(60) Provisional application No. 61/057,265, filed on May 30, 2008.

(30) Foreign Application Priority Data

May 30, 2008 (DE) .......................... 10 2008 026 093

(51) Int. Cl.
*B64D 13/00* (2006.01)

(52) U.S. Cl. .......................................... 454/76; 454/71

(58) Field of Classification Search .................... 454/71, 454/75, 76, 152, 154, 155, 284, 305, 292, 454/137, 136, 138

See application file for complete search history.

(56) References Cited

U.S. PATENT DOCUMENTS

| | | | | | |
|---|---|---|---|---|---|
| 2,775,186 | A | * | 12/1956 | Strobell | ........................ 454/109 |
| 4,742,760 | A | * | 5/1988 | Horstman et al. | .............. 454/76 |
| 5,897,079 | A | | 4/1999 | Specht et al. | |
| 7,247,088 | B2 | * | 7/2007 | Sogame | ........................ 454/124 |
| 2007/0111650 | A1 | | 5/2007 | Lerche | |

FOREIGN PATENT DOCUMENTS

| | | |
|---|---|---|
| DE | 10361654 | 8/2005 |
| FR | 852358 | 1/1940 |
| FR | 866604 | 10/1941 |
| FR | 1073651 | 9/1954 |

* cited by examiner

*Primary Examiner* — Steven B McAllister
*Assistant Examiner* — Brittany E Towns
(74) *Attorney, Agent, or Firm* — Wood, Herron & Evans, LLP

(57) ABSTRACT

A system for ventilating an aircraft cabin includes an air supply pipe connected to an air source, and a plurality of air distribution lines branching off from the air supply pipe. In a first operating state, the ventilating system is adapted to blow out the air, flowing through the air supply pipe, directly from the air distribution lines into the aircraft cabin. In contrast, in a second operating state of the ventilating system, at least some of the air distribution lines are connected to connecting lines which supply the air, flowing through the air supply pipe, to air outlets arranged in a distributed manner in the aircraft cabin.

14 Claims, 4 Drawing Sheets

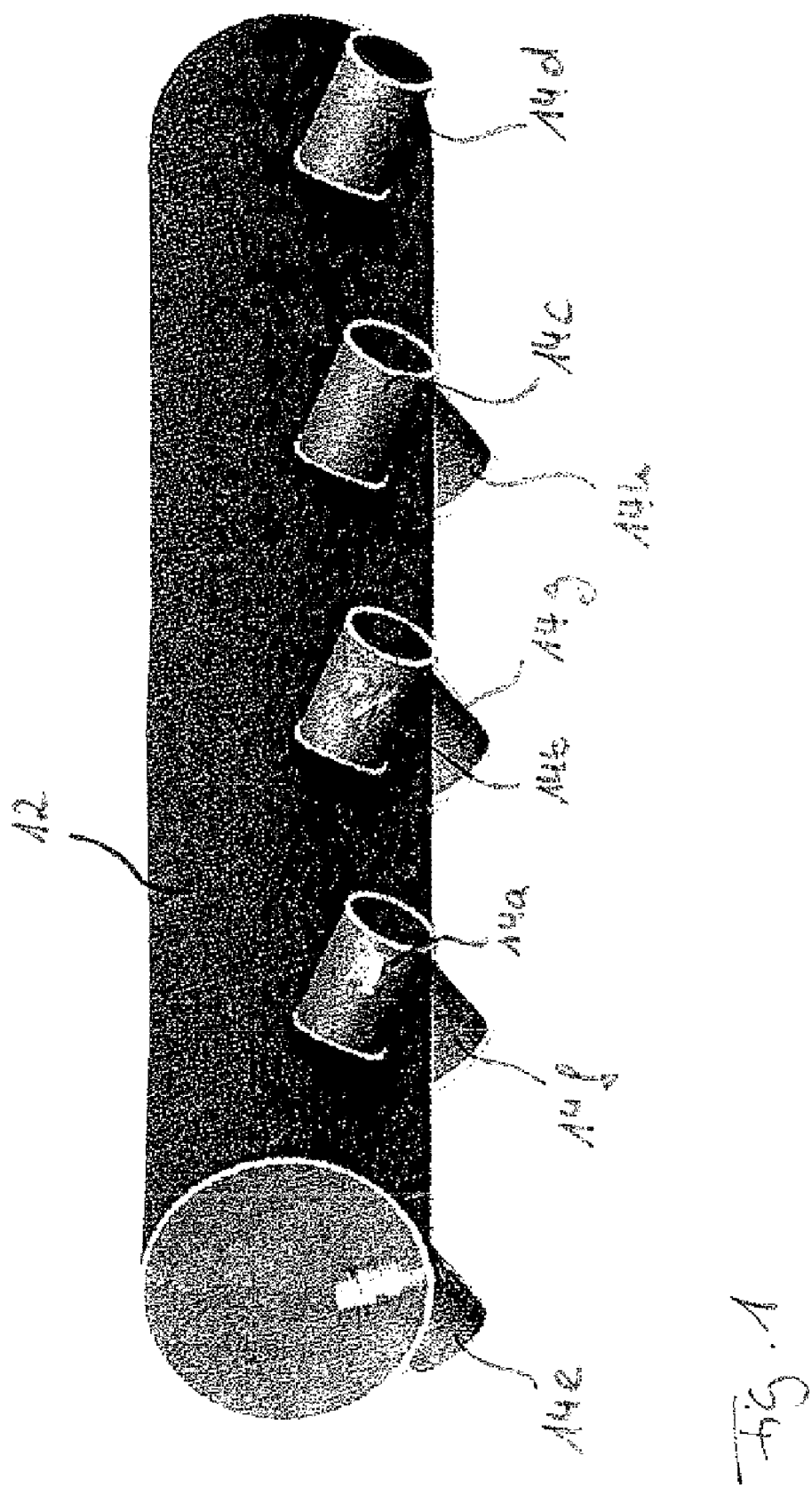

8,328,607 B2

ENHANCED PICCOLO DUCTING WITH SIDEWALL AIR OUTLETS

This application claims priority to U.S. Provisional Patent Application No. 61/057,265, filed on May 30, 2008; and/or German Patent Application No. 102008026093.2, filed on May 30, 2008.

TECHNICAL FIELD

The present invention relates to a system and a method for ventilating an aircraft cabin.

BACKGROUND

Systems, employed in cargo aircraft, for ventilating an aircraft cabin used as a cargo compartment comprise at present usually a piccolo pipe installed directly beneath the cabin ceiling. The piccolo pipe is provided with a plurality of air outlet openings, through which air flowing through the piccolo pipe can be blown out of the piccolo to pipe into the aircraft cabin. A ventilating system having a piccolo pipe as the central element for supplying ventilating air into an aircraft cabin is distinguished by a low weight and a low installation space volume. Furthermore, air blowing-out speeds of up to 15 m/s are attained with a ventilating system of this type. Owing to the blowing-out angle of the air from the piccolo pipe, intensive air mixing occurs in the aircraft cabin, making it virtually impossible to control different temperature zones.

Owing to their high air blowing-out speeds which are advantageously usable in a cargo aircraft, ventilating systems equipped with a piccolo pipe are, however, unsuitable for use in a passenger aircraft. At a blowing-out speed of the air from the piccolo pipe of up to 15 m/s, air speeds above 2 m/s could possibly occur in a passenger area of the aircraft cabin. These air speeds are, however, significantly above the comfort limit for people of about 0.35 m/s.

For this reason, ventilating systems with a central air supply pipe arranged in the region of the ceiling of the aircraft cabin and with a large number of branch pipes connected to the central air supply pipe are usually employed in passenger aircraft. The branch pipes lead the air to air outlets distributed in the aircraft cabin, the air outlets each being arranged and dimensioned such that a desired volume flow, a desired air exit angle and a desired maximum air blowing-out speed is achieved in the region of the air outlets. The disadvantages of known ventilating systems suitable for use in passenger aircraft are their relatively high weight and their large installation space requirement, particularly of the branch pipes.

In the case of an aircraft which, as required, is to be employed both as a cargo aircraft and for passenger transport, the basic problem is therefore to equip this aircraft with a ventilating system which meets the performance requirements made of the ventilating system in both applications. For example, it is known to equip an aircraft, designed for mixed use as a freighter and for passenger transport, with a ventilating system which comprises a full passenger cabin air supply system with branch pipes and with passenger air outlets distributed in the aircraft cabin. When this aircraft is to be used as a cargo aircraft, the cabin fittings installed for passenger transport are removed. However, the passenger cabin air supply system remains for the most part in the aircraft, in order to reduce the conversion time. In addition, to achieve the high blowing-out speeds of the air into the aircraft cabin which are desired for cargo transport, injector air outlets are connected to the central air supply of the ventilating system.

The present invention is directed to the object to provide a system and a method for ventilating an aircraft cabin which enable, in an aircraft which is to be employed both as a cargo aircraft and for passenger transport, optimum ventilation and multiple-zone temperature control of the aircraft cabin in both applications.

SUMMARY OF THE INVENTION

To achieve this object, a system according to the invention for ventilating an aircraft cabin comprises an air supply pipe connected to an air source. In the operation of the ventilating system according to the invention, air provided by the air source flows through the air supply pipe. A plurality of air distribution lines branch off from the air supply pipe. In a first operating state, the ventilating system according to the invention is adapted to blow out the air, flowing through the air supply pipe, directly from the air distribution lines into the aircraft cabin. In contrast, in a second operating state of the ventilating system, at least some of the air distribution lines are connected to connecting lines which supply the air, flowing through the air supply pipe, to air outlets arranged in a manner distributed in the aircraft cabin.

In the first operating state of the ventilating system according to the invention, it is not necessary for the connecting lines and the air outlets connected to the connecting lines to be installed in the aircraft. Instead, in the first operating state of the ventilating system, proper functioning of the ventilating system is ensured by the air supply pipe and the air distribution lines alone. When the ventilating system is to be operated in its first operating state, the ventilating system may therefore be designed in a particularly lightweight and installation-space-saving manner. Moreover, in the first operating state of the system according to the invention for ventilating an aircraft cabin, high air blowing-out speeds of up to 15 m/s may be achieved, as with a ventilating system equipped with a piccolo pipe. As a result of the high air blowing-out speeds and an optimisation of the air blowing-out angle, which will be explained in more detail below, the ventilating system according to the invention optimises air mixing in the aircraft cabin and facilitates the temperature control in the aircraft cabin. In its first operating state, the ventilating system according to the invention is thus particularly well suited to supplying ventilating air to an aircraft cabin used as a cargo compartment.

In contrast, in the second operating state of the system according to the invention for ventilating an aircraft cabin, the air flowing through the air supply pipe can be supplied into the aircraft cabin at a significantly reduced air blowing-out speed via the air outlets arranged in a distributed manner in the aircraft cabin. An air volume flow through the air outlets, an exit angle of the air from the air outlets and/or a maximum blowing-out speed of the air from the air outlets may thus be controlled such that people in the aircraft cabin find the ventilation comfortable. In particular, these parameters may be controlled such that the air speeds in regions of the aircraft cabin where there are people do not exceed 0.35 m/s. Consequently, the operation of the ventilating system according to the invention in its second operating state is particularly advantageous when the system is to be employed for ventilating an aircraft cabin provided for the transport of passengers.

The system according to the invention for ventilating an aircraft cabin enables, in an aircraft which is to be employed as a cargo or passenger aircraft as required, optimum ventilation of the aircraft cabin in both applications. Furthermore, a ventilating system according to the invention operated in its first operating state can be converted in a simple and time-saving manner for operation in its second operating state. For this purpose, all that is required is to install the connecting lines and the air outlets in the aircraft and to connect the connecting lines to the air distribution lines. Similarly, a ventilating system according to the invention operated in its second operating state can be converted in a simple and time-saving manner for operation in the first operating state, since all this is required for this purpose is to separate the connecting lines from the air distribution lines. The connecting lines and the air outlets may be removed from the aircraft. The installation space taken up by the connecting lines and the air outlets in the second operating state of the ventilating system can then be utilised, in the first operating state of the ventilating system, in an advantageous manner for increasing the cargo-transporting capacity of the aircraft. In a particularly preferred embodiment of the ventilating system according to the invention, the connecting lines and the air outlets are, however, dimensioned and arranged behind the aircraft structure such that they can remain in the aircraft even when the ventilating system is operated in its first operating state, without limiting the cargo-transporting capacity of the aircraft. Removal of the connecting lines and the air outlets is only necessary if the weight of the ventilating system operating in its first operating state is to be kept particularly low.

A further advantage of the system according to the invention for ventilating an aircraft cabin over a ventilating system equipped with a conventional piccolo pipe is that the air distribution lines, connected to the air supply pipe, of the ventilating system according to the invention ensure an orientation of the air flow perpendicular to a main air flow direction through the air supply pipe and hence an optimisation of the blowing-out angle of the air from the air supply pipe. In contrast, when using a conventional piccolo pipe, the wall thickness of the pipe is not sufficient to deflect by 90° the air flow flowing through the piccolo pipe. This results in stronger longitudinal flows in the aircraft cabin ventilated by means of the piccolo pipe. In contrast, in an aircraft cabin ventilated by the ventilating system according to the invention in its first operating state, a significantly more two-dimensional flow is formed, so that an air exchange in the longitudinal direction is minimised. On the other hand, within individual temperature zones arranged in the longitudinal direction of the aircraft cabin, very intensive air mixing occurs owing to the high air blowing-out speeds. This enables a more uniform ventilation and a more uniform fresh-air supply in all regions of the aircraft cabin. Furthermore, the temperature control in the aircraft cabin is facilitated.

The system according to the invention for ventilating an aircraft cabin may be operated completely, that is over the entire length of the air supply pipe, in its first operating state or its second operating state. Alternatively, however, it is also conceivable to operate the system partly in its first and partly in its second operating state. For example, in a first section of the air supply pipe, air distribution lines connected to the air supply pipe may be used to blow the air, flowing through the air supply pipe, directly into the aircraft cabin. In contrast, in a second section of the air supply pipe, air distribution lines connected to the air supply pipe may be connected to corresponding connecting lines and air outlets in order to supply the air, flowing through the air supply pipe, to the aircraft cabin via the connecting lines and the air outlets. The ventilating system according to the invention may therefore also be employed in a particularly advantageous manner in an aircraft whose cabin is used partly as a cargo compartment and partly as a passenger cabin. As a result of the simple conversion of the ventilating system, the dividing of the aircraft cabin into cargo compartment and passenger cabin can be done flexibly, as required.

Furthermore, it is conceivable to operate the system according to the invention for ventilating an aircraft cabin in a kind of "mixed operating state". When the ventilating system according to the invention is to be operated in a "mixed operating state" only some of the air distribution lines are connected via corresponding connecting lines to air outlets arranged in a distributed manner in the aircraft cabin. In the case of such a configuration of the ventilating system according to the invention, part of the air to be supplied to the aircraft cabin may be supplied at a high air blowing-out speed into the aircraft cabin directly from the air distribution lines. In contrast, part of the air to be supplied to the aircraft cabin is supplied to the aircraft cabin at a lower air blowing-out speed via the air outlets.

Preferably, the air distribution lines extend in the form of connecting stubs from the air supply pipe. The air distribution lines may then be connected to corresponding connecting lines in a particularly simple, time- and thus cost-saving manner when the ventilating system according to the invention is to be operated in its second operating state. A simple connection of the air distribution lines to corresponding connecting lines is made possible particularly when the connecting lines are designed in the form of flexible tubes.

The air distribution lines may be connected to the air supply pipe of the system according to the invention for ventilating an aircraft cabin in such a way that they extend in a manner inclined at an angle of approximately 30° relative to a circumferential surface of the air supply pipe. Such a configuration of the air supply pipe and of the air distribution lines enables an optimised air flow guidance both in the first and in the second operating state of the ventilating system according to the invention.

A first group of air distribution lines may extend from the circumferential surface of the air supply pipe substantially in the direction of a first aircraft cabin sidewall when the ventilating system according to the invention is mounted in an aircraft. Alternatively or additionally, a second group of air distribution lines may extend from the circumferential surface of the air supply pipe substantially in the direction of a second aircraft cabin sidewall when the ventilating system is mounted in an aircraft. As a result of such a configuration of the air supply pipe and of the air distribution lines, the air is blown out in the direction of the aircraft cabin sidewalls in the first operating state of the ventilating system, whereby an optimum distribution of the ventilating air to be supplied to the aircraft cabin can be achieved, particularly when the air supply pipe extends substantially centrally in the region of a ceiling of the aircraft cabin in the state of the ventilating system when mounted in an aircraft. In contrast, in the second operating state of the ventilating system, the air distribution lines owing to their lateral orientation may be connected in a simple manner to corresponding connecting lines.

The air outlets are preferably arranged in the region of the first and/or the second aircraft cabin sidewall when the ventilating system according to the invention is mounted in an aircraft. Air outlets arranged in the region of the aircraft cabin sidewalls enable the formation of an air flow in the aircraft cabin with air circulations similar to those which arise in the case of conventional mixed ventilation in a passenger aircraft. Furthermore, air outlets arranged in the region of the aircraft cabin sidewalls may also be employed in aircraft which are not provided with a ceiling covering. For example, the air outlets may be positioned in the region of the aircraft cabin sidewalls above the windows.

When the system according to the invention for ventilating an aircraft cabin is mounted in an aircraft, an air outlet is preferably provided at least in a partial region of the aircraft cabin in every second space between two ribs of the aircraft cabin, that is in every second region of the aircraft cabin bounded by two ribs adjacent to one another. Such a configuration of the ventilating system according to the invention ensures a sufficient air supply Into the aircraft cabin in the second operating state of the ventilating system. At the same time, a certain flexibility in the cabin design and in the construction of the ventilating system is retained, since it is possible to shift individual air outlets to a space between two ribs which was previously not provided with an air outlet. For example, fittings which are to be positioned only in certain regions of the aircraft cabin may make it necessary to shift the air outlets from one space between two ribs to an adjacent space between two ribs. Furthermore, spaces between two ribs of one aircraft sidewall which are not provided with an air outlet may be used to receive air outlets which are actually intended for arrangement in the region of the opposite aircraft sidewall, if they cannot be installed there, for example in the region of a door or the like. It can thus be ensured that the same quantity of air can always be introduced into the individual regions of the aircraft cabin without excessively increasing the blowing-out speed of the air from the air outlets.

The air supply pipe may be arranged substantially centrally or off-centre in the region of a ceiling of the aircraft cabin when the ventilating system according to the invention is mounted in an aircraft. An arrangement of the air supply pipe in the region of the aircraft cabin ceiling enables a particularly installation-space-saving installation of the air supply pipe and of the air distribution lines, and also of the connecting lines to be connected to the air distribution lines in the second operating state of the ventilating system.

An orifice may be arranged in at least some of the air distribution lines The orifice serves to control as desired the flow properties of the air flow exiting from the air distribution lines. Preferably, the orifice is adapted also to completely close the air distribution line, if required. It is thereby possible to prevent, in the second operating state of the ventilating system according to the invention, the air of the aircraft cabin flowing through the air supply pipe from being supplied in an undesired manner, that is at an undesirably high air blowing-out speed, from air distribution lines which are not connected to a corresponding connecting line. This enables a particularly flexible configuration and a particularly flexible operation of the ventilating system according to the invention.

The air outlets arranged in a distributed manner in the aircraft cabin may have a substantially square cross-section. Air outlets having a square cross-section provide a greatest-possible area with a minimised edge length and are therefore particularly well suited to achieving low blowing-out speeds of the air into the aircraft cabin. If desired or necessary, however, the air outlets arranged in a distributed manner in the aircraft cabin may also have any other cross-section.

The system according to the invention for ventilating an aircraft cabin preferably further comprises a fastening device for fastening the air supply pipe to an aircraft structure. Preferably, the fastening device is adapted to fasten the air supply pipe, in the first operating state of the ventilating system, in a first position to the aircraft structure and to fasten the air supply pipe, in the second operating state of the ventilating system, in a second position to the aircraft structure. Preferably, the air supply pipe, when it is in its second position, is rotated relative to its first position. In the first position of the air supply pipe, the air supply pipe and in particular the air distribution lines connected to the air supply pipe are preferably oriented so as to enable an optimum ventilation of the aircraft cabin through the air distribution lines. In contrast, in the second position of the air supply pipe, the air distribution lines connected to the air supply pipe may be connected in a particularly simple and installation-space-saving manner to corresponding connecting lines for connecting the air distribution lines to the air outlets arranged in a distributed manner in the aircraft cabin. The fastening device may be designed, for example, in the form of a clamp or a plurality of clamps which enables/enable a simple rotation of the air supply pipe between its first and its second position.

If the ventilating system according to the invention is configured so that the air supply pipe is moved between a first and a second position on a change of the operating state of the ventilating system, the air supply pipe may be formed with a plurality of parts, with sections rotatable relative to one another, particularly when the ventilating system is also to be operated in a "mixed operating state". A first section of the air supply pipe may then be fastened, for example, in its first position to the aircraft structure in order to enable the operation of a part of the ventilating system assigned to the first air supply pipe section in its first operating state. In contrast, a second section of the air supply pipe may be fastened in its second position to the aircraft structure in order to enable the operation of a part of the ventilating system assigned to the second air supply pipe section in its second operating state.

A method according to the invention for ventilating an aircraft cabin by means of a ventilating system comprises the following steps: supplying air from an air source into an air supply pipe and distributing the air, flowing through the air supply pipe, to a plurality of air distribution lines branching off from the air supply pipe. The air flowing through the air supply pipe is blown out, in a first operating state of the ventilating system, directly from the air distribution lines into the aircraft cabin. In contrast, in a second operating state of the ventilating system connecting lines connected to at least some of the air distribution lines supply the air, flowing through the air supply pipe, to air outlets arranged in a distributed manner in the aircraft cabin.

When the air flowing through the air supply pipe is blown out directly from the air distribution lines at a high blowing-out speed into the aircraft cabin, the method according to the invention is particularly well suited to ventilating an aircraft cabin used as a cargo compartment. In contrast, the method according to the invention may be employed in a particularly advantageous manner for ventilating an aircraft cabin used as a passenger cabin when the air flowing through the air supply pipe is supplied at a lower blowing-out speed to the aircraft cabin via the connecting lines and the air outlets arranged in a distributed manner in the aircraft cabin.

BRIEF DESCRIPTION OF THE DRAWINGS

A preferred embodiment of a system according to the invention for ventilating an aircraft cabin is now explained in more detail with reference to the appended schematic drawings, of which:

FIG. 1 shows a three-dimensional illustration of an air supply pipe of a system for ventilating an aircraft cabin, which pipe is connected to a plurality of air distribution lines branching off from the air supply pipe;

DETAILED DESCRIPTION

Figure 2A:
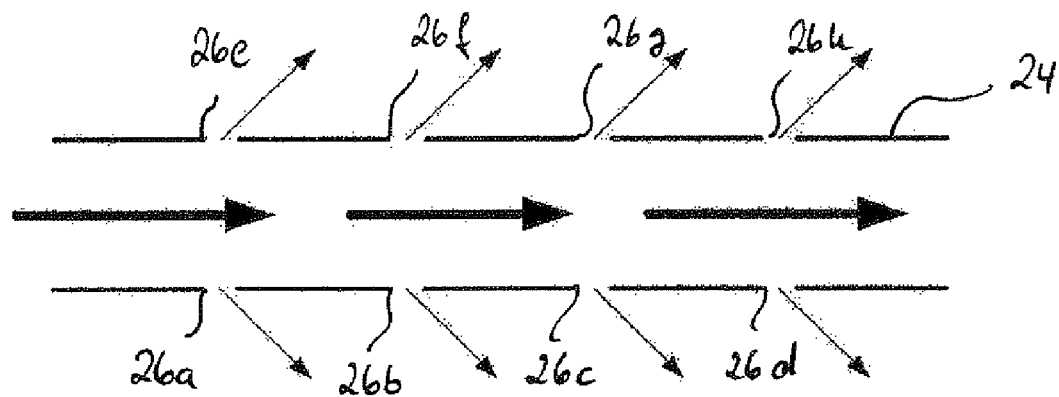
FIG. 2a shows a schematic illustration of the air flow distribution in a system for ventilating an aircraft cabin equipped with a conventional piccolo pipe.

In the figures, a system for ventilating an aircraft cabin is denoted generally by 10. The ventilating system 10 comprises an air supply pipe 12 connected to an air source, not illustrated specifically. In the operation of the ventilating system 10, air flows through the air supply pipe 12. The air supply pipe 12 is shown with a round cross-section in FIGS. 1, 3, 4 and 5. The air supply pipe 12 may, however, also have an oval cross-section or any other cross-section.

A plurality of air distribution lines 14a-14h designed in the form of connecting stubs branch off from the air supply pipe 12. When the air supply pipe 12 and the air distribution lines 14a-14h are mounted in an aircraft in the region of a ceiling 15 of the aircraft cabin, a first group of air distribution lines 14a-14d extends substantially in the direction of a first aircraft cabin sidewall 16. In contrast, when the air supply pipe 12 and the air distribution lines 14a-14h are mounted in an aircraft, a second group of air distribution lines 14e-14h extends substantially in the direction of a second aircraft cabin sidewall 18 (see FIG. 5). The air distribution lines 14a-14h are inclined at an angle of approximately 30° relative to a circumferential surface of the air supply pipe 12. If necessary or desired, however, another orientation of the air distribution lines 14a-14h relative to the circumferential surface of the air supply pipe 12 is also possible.

Figure 3:
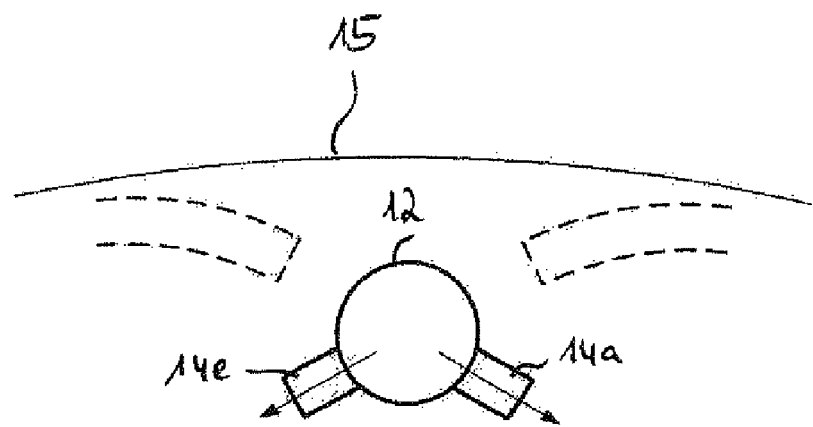
FIG. 3 shows an air supply pipe and air distribution lines according to FIG. 1 in a first operating state of a system for ventilating an aircraft cabin.

In a first operating state of the ventilating system 10, the air flowing through the air is supply pipe 12 is supplied into the aircraft cabin directly from the air distribution lines 14a-14h at a high air blowing-out speed of up to 15 m/s (see FIG. 3). These high blowing-out speeds of the air into the aircraft cabin ensure an optimisation of the air mixing in the aircraft cabin and thus facilitate temperature control in the aircraft cabin. In its first operating state, the ventilating system 10 is thus particularly suitable for ventilating an aircraft cabin used as a cargo compartment.

When the ventilating system 10 is to be operated in its first operating state, the provision of connecting lines 20a, 20e and air outlets 22a, 22e is not necessary. Rather, for a ventilating system 10 provided for operation in its first operating state, it is sufficient for the system 10 to be equipped with an air supply pipe 12 and with air distribution lines 14a-14h connected to the air supply pipe 12. The ventilating system 10 is then distinguished by a particularly low weight and a particularly small installation volume.

Figure 2B:
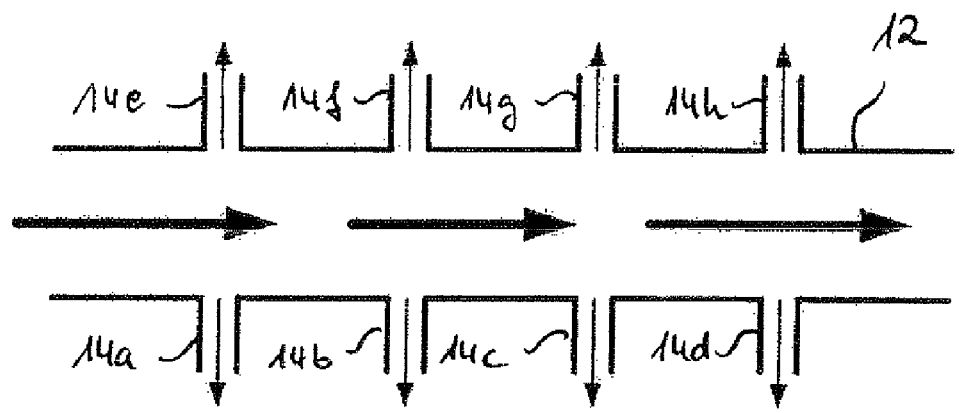
FIG. 2b shows a schematic illustration of the air flow distribution in a system for ventilating an aircraft cabin equipped with an air supply pipe and air distribution lines according to FIG. 1.

Furthermore, it is advantageous, particular when the ventilating system 10 is operated in its first operating state, that the air distribution lines 14a-14h connected to the air supply pipe 12 ensure an orientation of the air flow from the air distribution lines 14a-14h perpendicularly to a main flow direction of the air through the air supply pipe 12 (see FIG. 2b). In contrast, in a ventilating system equipped with a conventional piccolo pipe 24, a wall thickness of the piccolo pipe 14 is not sufficient to deflect the air flowing through the piccolo pipe 24 by 90° as it exits from air outlet openings 26a-26h provided in the piccolo pipe 24 (see FIG. 2a). Owing to the air flow distribution through the air distribution lines 14a-14h, the ventilating system 10 thus enables the formation of a significantly more two-dimensional flow in the aircraft cabin supplied with ventilating air than a system equipped with a conventional piccolo pipe. As a result, an air exchange in the aircraft cabin in the longitudinal direction is reduced, so that a more uniform ventilation of the aircraft cabin and hence a more uniform fresh-air supply in all regions of the aircraft cabin becomes achievable.

Figure 4:
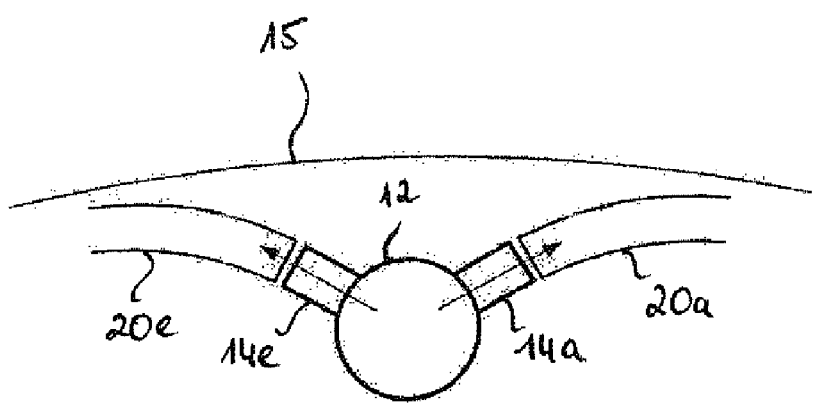
FIG. 4 shows an air supply pipe and air distribution lines according to FIG. 1 in a second operating state of a system for ventilating an aircraft cabin.

In a second operating state of the ventilating system 10, the air distribution lines 14a-14h are, in contrast, connected to corresponding connecting lines 20a, 20e (see FIG. 4). The connecting lines 20a, 20e supply the air exiting from the air distribution lines 14a-14h to air outlets 22a, 22e arranged in a distributed manner in the aircraft cabin (see FIG. 5). In the second operating state of the ventilating system 10, the air flow in the region of the air outlets 22a, 22e is controlled such that a desired air volume flow, a desired air exit angle from the air outlets 22a, 22e and a desired maximum blowing-out speed of the air from the air outlets 22a, 22e into the aircraft cabin is achieved. In particular, these parameters are controlled such that the air speed in a region of the aircraft cabin in which there may be people does not exceed 0.35 metres per second. In a second operating state, the ventilating system 10 therefore enables the ventilation of an aircraft cabin used as a passenger cabin.

In order to convert a ventilating system 10 operated in its first operating state for operation in its second operating state, all that is required is to install, where necessary, the connecting lines 20a, 20e and the air outlets 22a, 22e in the aircraft and to connect the connecting lines 20a, 20e to the corresponding air distribution lines 14a, 14e. A particularly installation-space-saving installation of the connecting lines 20a, 20e is made possible when the connecting lines 20a, 20e are designed in the form of flexible tubes and the air supply pipe 12 with the air distribution lines 14a-14h connected thereto is rotated through 180 degrees before the connection of the connecting lines 20a, 20e to the corresponding air distribution lines 14a, 14e (see FIGS. 3 and 4).

Since the air supply pipe 12 with the air distribution lines 14a to 14h is fastened to an aircraft structure by means of a fastening device designed in the form of clamp (not shown in the figures), the air supply pipe 12 with the air distribution lines 14a-14h can be moved in a simple manner, by releasing the clamp, from its first position optimised for the operation of the ventilating system 10 in the first operating state to its second position optimised for the operation of the ventilating system 10 in its second operating state.

Similarly, an aircraft cabin ventilating system 10 which is operated in its second operating state can be converted in a simple and time-saving manner for operation in its first operating state. For this purpose, all that is required is to release the connection between the connecting lines 20a, 20e and the corresponding air distribution lines 14a, 14e and, if desired, to remove the connecting lines 20a, 20e and the air outlets 22a, 22e from the aircraft for weight reduction reasons.

Figure 5:
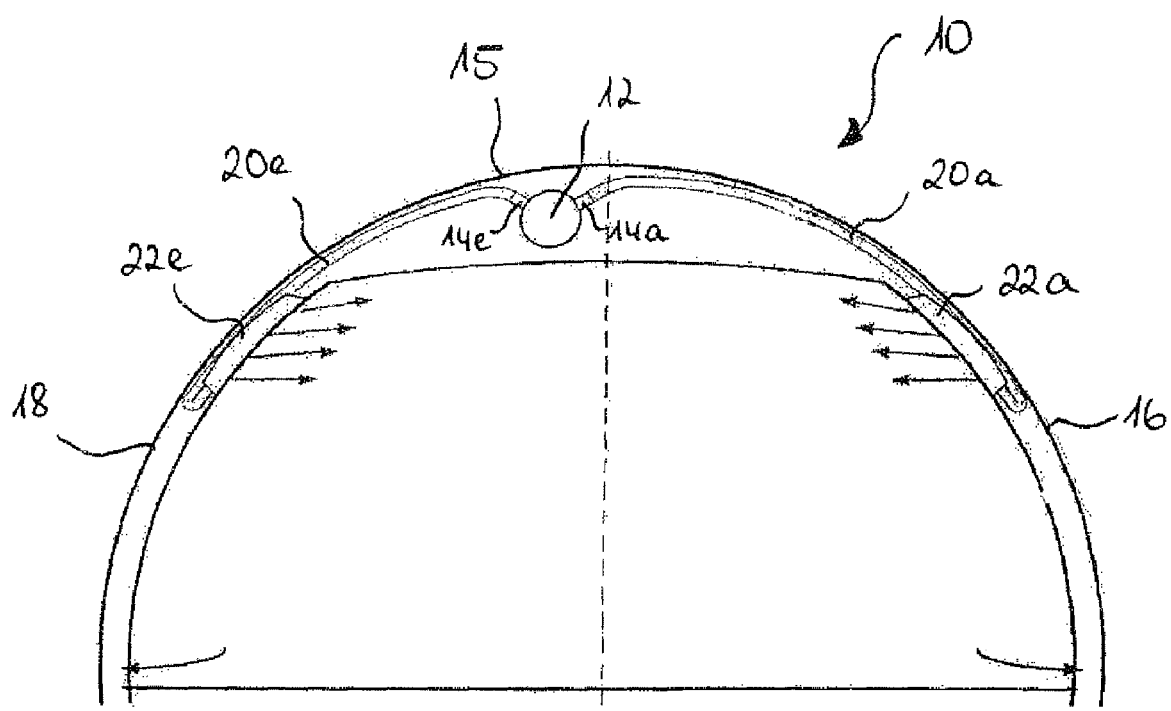
FIG. 5 shows a system for ventilating an aircraft cabin in a second operating state and when mounted in an aircraft.

As can be seen in FIG. 5, the air outlets 22a, 22e of the ventilating system 10 are arranged in the region of the aircraft cabin sidewalls 16, 18 above windows, not illustrated in FIG. 5, and have a substantially square cross-section. Such a lateral arrangement of the air outlets 22a, 22e is also possible when there is no ceiling covering installed in the aircraft cabin. Although only two connecting lines 20a, 20e and only two air outlets 22a, 22e are illustrated in each of FIGS. 3-5, an air outlet is provided in the ventilating system 10 when it is mounted in an aircraft, at least in a partial region of the aircraft cabin in every second space between two ribs of the aircraft cabin. As a result, a sufficient air supply into the aircraft cabin is ensured and at the same time a certain flexibility with regard to the design of the aircraft cabin and of the ventilating system 10 is ensured.

Arranged in each of the air distribution lines 14a-14h are orifices (not illustrated in the figures). The orifices serve to control the air flow through the air distribution lines 14a-14h. In principle, it is possible to equip all of the air distribution lines 14a-14h with corresponding orifices. Alternatively, however, only selected air distribution lines 14a-14h may be provided with corresponding orifices. The orifices are configured so as to enable complete closure of the air distribution lines 14a-14h if required.

In principle, all of the air distribution lines 14a-14h may be connected to corresponding connecting lines 20a, 20e in the second operating state of the ventilating system 10. Alternatively, however, it is also possible, in contrast, for only selected air distribution lines 14a-14h to be connected to corresponding connecting lines 20a, 20e in the second operating state of the ventilating system 10. Air distribution lines 14a-14h which are not connected to corresponding connecting lines 20a, 20e may either be closed by means of an orifice or blow out air into the aircraft cabin in order to achieve a kind of "mixed operating state" of the ventilating system 10.

Furthermore, the ventilating system 10 may be operated completely, that is over the entire length of the air supply pipe 12, in its first operating state or its second operating state. Alternatively, however, it is also conceivable to operate the system 10 partly in its first and partly in its second operating state. For example, in a first section of the air supply pipe 12, air distribution lines 14a-14h connected to the air supply pipe 12 may be used to blow the air, flowing through the air supply pipe 12, directly into the aircraft cabin. In a second section of the air supply pipe 12, air distribution lines 14a-14h connected to the air supply pipe 12 may, in contrast, be connected to corresponding connecting lines 20a, 20e and air outlets 22a, 22e in order to supply the air, flowing through the air supply pipe 12, to the aircraft cabin via the connecting lines 20a, 20e and the air outlets 22a, 22e. The ventilating system 10 may then also be employed in an aircraft whose cabin is used partly as a cargo compartment and partly as a passenger cabin.

The invention claimed is:

1. A ventilating system for ventilating an aircraft cabin, comprising:
   an air supply pipe connected to an air source, and
   a plurality of air distribution lines connected to and branching off from the air supply pipe,
   wherein the ventilating system is adapted to blow out the air, flowing through the air supply pipe, directly from the air distribution lines into the aircraft cabin, and when operating in a first operating state
   wherein when operating in a second operating state at least some of the air distribution lines are connected to connecting lines which supply the air, flowing from the air supply pipe, to air outlets arranged in a distributed manner in the aircraft cabin, wherein the air supply pipes rotates to move from the first operating state to the second operating state.

2. The ventilating system according to claim 1, wherein the air distribution lines include connecting stubs extending from the air supply pipe.

3. The ventilating system according to claim 1, wherein the air distribution lines are inclined at an angle of approximately 30° relative to a circumferential surface of the air supply pipe.

4. The ventilating system according to claim 1, wherein a first group of the air distribution lines extends substantially in the direction of a first aircraft cabin sidewall when the ventilating system is mounted in an aircraft, and a second group of the air distribution lines extends substantially in the direction of a second aircraft cabin sidewall when the ventilating system is mounted in an aircraft.

5. The ventilating system according to claim 4, wherein the air outlets are positioned at the first and/or the second aircraft cabin sidewall when the ventilating system is mounted in an aircraft.

6. The ventilating system according to claim 1, wherein when the ventilating system is mounted in an aircraft, an air outlet is positioned at least in a partial region of the aircraft cabin in every second space between two ribs of the aircraft cabin.

7. The ventilating system according to claim 1, wherein the air supply pipe is positioned at a ceiling of the aircraft cabin when the ventilating system is mounted in an aircraft.

8. The ventilating system according to claim 1, wherein an orifice is included in least some of the air distribution lines.

9. The ventilating system according to claim 1, wherein the air outlets have a substantially square-shaped cross-section.

10. The ventilating system according to claim 1, further comprising:
    a fastening device for fastening the air supply pipe to an aircraft structure, the fastening device being adapted to fasten the air supply pipe, in the first operating state of the ventilating system, in a first position to the aircraft structure and to fasten the air supply pipe, in the second operating state of the ventilating system, in a second position, rotated relative to the first position, to the aircraft structure.

11. A method for ventilating an aircraft cabin with a ventilating system, comprising:
    supplying air from an air source into an air supply pipe,
    distributing the air, flowing through the air supply pipe, to a plurality of air distribution lines connected to and branching off from the air supply pipe,
    blowing the air flowing through the air supply pipe directly from the air distribution lines into the aircraft cabin in a first operating state of the ventilating system, and
    blowing the air flowing through the air supply pipe through connecting lines connected to at least some of the air distribution lines and through air outlets arranged in a distributed manner in the aircraft cabin in a second operating state of the ventilating system wherein the air supply pipe is rotated between the first operating state and the second operating state.

12. The method according to claim 11, further comprising:
    rotating the air supply pipe between a first position out of communication with the connecting lines in the first operating state of the ventilating system, and a second position in communication with the connecting lines in the second operating state of the ventilating system.

13. The method according to claim 11, further comprising:
    removing the connecting lines and the air outlets from the aircraft cabin in the first operating state of the ventilating system.

14. The ventilating system according to claim 1, wherein the connecting lines and the air outlets are removably connected to the aircraft cabin so that in the first operating state, the connecting lines and the air outlets are removed to reduce space and weight constraints added by the connecting lines and the air outlets.

* * * * *